United States Patent [19]
Ishikawa et al.

[11] 3,982,680
[45] Sept. 28, 1976

[54] SOLDERING METHOD

[75] Inventors: Kanichi Ishikawa, Aichi; Kazumi Iijima, Kariya, both of Japan

[73] Assignee: Nippondenso Co., Ltd., Kariya, Japan

[22] Filed: Jan. 9, 1975

[21] Appl. No.: 539,741

[30] Foreign Application Priority Data
Feb. 14, 1974   Japan.................... 49-18315

[52] U.S. Cl. .................................. 228/174
[51] Int. Cl.² ............................... B23K 31/02
[58] Field of Search ............... 29/157.3 C; 228/56, 228/141, 164, 165, 174, 183, 208, 210, 245, 246, 249, 254, 255

[56]   References Cited
UNITED STATES PATENTS
1,823,028   9/1931   Caldwell .................... 228/141 X
3,386,152   6/1968   Plegat ......................... 228/254 X

*Primary Examiner*—Al Lawrence Smith
*Assistant Examiner*—Margaret Joyce
*Attorney, Agent, or Firm*—Cushman, Darby & Cushman

[57]   ABSTRACT

A method for soldering a pipe comprises the following steps: forming a concave portion on a flat metal sheet with solder coated thereon uniformly over its whole surface, opening an aperture at the bottom of the concave portion, making said flat metal sheet circular to make a pipe, inserting a member into said concave portion and heating said pipe and member together to melt said solder so that it infiltrates into the clearance between the inner surface of said concave portion and outer surface of said member.

5 Claims, 4 Drawing Figures

SOLDERING METHOD

BACKGROUND OF THE INVENTION

This invention relates to an improved soldering method which may be applicable to any circular member to be soldered rigidly, more particularly to a soldering method for soldering an inlet and an outlet pipe to a flat tube in the evaporator of a cooling system.

In a conventional method for soldering such a member to a tube, an aperture is formed on an outer surface of the pipe and, then, a member, such as aforementioned flat tube is inserted through the aperture and a solder is put therearound. Thereafter, such arrangement is subjected to heat which is enough to melt the solder usually in a vacuum furnace. At that time, the solder often goes out of the clearance between the flat tube and aperture and, moreover, the edge of the aperture is apt to deform because of the high temperature, resulting in poor sealing function and inaccurate configuration. Furthermore it is not easy to form the aperture on the outer surface of the pipe, because a die inserted into the pipe to form the aperture can not endure a long-time use, especially when the diameter of the pipe is small.

SUMMARY OF THE INVENTION

With a view to overcome the problem described above, it is the primary object of the present invention to provide an improved soldering method which is very useful for mass-production in which a die is endurable against long-time use and heavy load and obtainable an accurate soldered arrangement in both size and configuration.

The above and other objects, features and advantages of the present invention will become apparent from the following detailed description of the preferred embodiments taken in conjunction with the accompanying drawings.

DESCRIPTION OF THE PREFERRED EMBODIMENT

Figure 1:
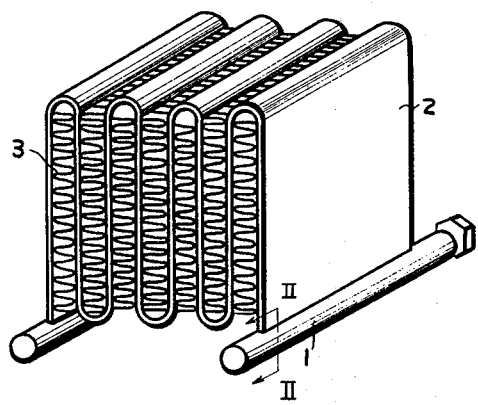
FIG. 1 is a perspective view of an evaporator into which the present invention is applied.

The present invention will be explained below, referring to an evaporator in the cooling system. Referring to FIG. 1, numeral 1 designates an inlet pipe made of aluminum or aluminum alloy, into which the refrigerant is supplied from an expansion valve which is not shown. An undulating flat tube 2 is soldered to the inlet pipe 1 at its one end and to the outlet pipe at the other end, therefore, the refrigerant flows from the inlet pipe 1 to the outlet pipe through the flat tube 2. Fins 3 are fixed between the rows of the plane tube 2.

Figure 2:
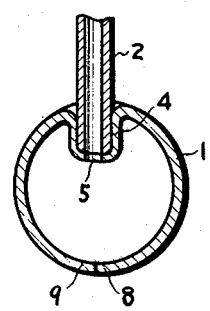
FIG. 2 is an enlarged cross sectional view taken along the line II—II in FIG. 1, which shows the first embodiment of the present invention.

As shown in FIG. 2, a concave portion 4 is formed in the inlet pipe 1 with an aperture 5 opened at the bottom thereof. At first a sheet of aluminum or aluminum alloy on which solder is coated over the whole surface thereof is provided. The solder consists of 9.5% Si, 1.5% Mg, and 89% Al (example) and is as thick as about 10% of that of the sheet. While the sheet coated with solder on one surface of the base material is available, the sheet coated with solder on the both surfaces is adopted in this embodiment. Next, the sheet is pressed to form the concave portion 4 and pressed again to form a pipe as shown in FIG. 2. The pipe is dipped in a solvent such as trichloroethylene to remove the oil adhering on its surface. The flat tube 2, after being dipped in the solvent, is inserted into the concave portion 4 of the inlet pipe 1. In this embodiment, the plane tube 2 has solder on its both sides so that the fins 3 are soldered to the plane tube 2 simultaneously, however a pipe having no solder thereon is of course available, when the inlet pipe 1 bears the solder. Then the inlet pipe 1 with the plane tube 2 combined is put in the vacuum furnace to be heated at a temperature of about 605°C for 2 minutes under a pressure of about $1 \times 10^{-5}$ mm-Hg. In this process, the solder penetrates into the clearance between the inner surface of the concave portion 4 and the outer surface of the plane tube 2 to sufficiently fix the inlet pipe 1 to the plane tube 2. Since the concave portion 4 is rigid enough not to be deformed, the clearance between the inner surface of the concave portion 4 and the outer surface of the plane pipe 2, keeps unchanged resulting in uniform distribution of the solder. The joint portions 8 and 9 opposite to the concave portion 4 of the inlet pipe 1 are fixed well by the solder drops reaching from its both surfaces by their weight.

Figure 3:
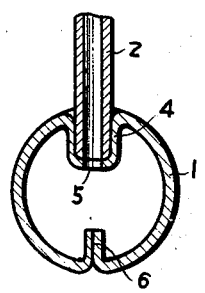
FIG. 3 is an enlarged cross sectional view of the corresponding part of FIG. 2, which shows the second embodiment of the present invention.

Referring to FIG. 3 which shows another embodiment, a flange portion 6 is formed at both ends of said sheet 1. According to this embodiment, the joint portion is soldered over a whole surface of the flange 6, which ensures the joint more sufficient than the embodiment of FIG. 2. This flange portion 6 is made by pressing simultaneously when the concave portion 4 is made. The inlet pipe 1 is made in somewhat different manner. At first, a metal sheet with solder coated thereon is formed circular with the both ends abutting to each other, and then the concave portion 4 is formed by pressing at the same position as aforementioned.

Figure 4:
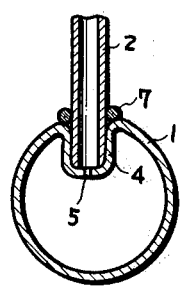
FIG. 4 is an enlarged cross sectional veiw of the corresponding part of FIG. 2, which shows the third embodiment of the present invention.

According to FIG. 4 which shows a further embodiment, a tubular material which has a separate solder 7 on the surface thereof is formed with a concave portion 4 by pressing in the same manner as aforementioned. In the vacuum furnace the solder melts to fix the plane pipe 2 and inlet pipe 1 to each other.

As shown in the drawings, the aperture 5 is narrower than the bottom of the concave portion 4, so that when the flat tube 2 is inserted into the concave portion, the end of the flat tube lies next to the bottom of the concave portion, astride and circumscribing the aperture. This is in contrast to the aforementioned conventional method, wherein during the soldering operation, the solder often goes out of the clearance between the flat tube and the aperture and wherein the aperture is apt to deform with undersirable results.

In the description, the present invention is applied to the evaporator of the cooling system, however, it can be applied to any construction which needs the soldering of pipes and, of course, can be applied to any other metal sheet besides aluminum and aluminum alloy. The heating process can be varied according to the sheet material, solder material or the configuration of the soldered member.

What we claim is:

1. A method for soldering a pipe to a member comprising the steps of:
   making a pipe from a flat metal sheet with solder coated uniformly over its whole surface,
   forming a concave portion on an outer surface of said pipe with an aperture at the bottom thereof,
   inserting a member into said concave portion,
   heating said pipe and member together to melt said solder to infiltrate into the clearance between an inner surface of said concave portion and outer surface of said member and thereby place the member in sealed communication with the aperture; and
   forming a flange portion at two opposite margins of the sheet, so that when the sheet is made into a pipe the two flanges lie face to face at the opposite side of the pipe from said concave portion and become connected by said solder upon said heating of the pipe.

2. A method for soldering a pipe to a member comprising the steps of:
   forming a concave portion on a flat metal sheet with solder coated uniformly over its whole surface,
   opening an aperture at the bottom of said concave portion,
   making said flat metal sheet tubular to make a pipe,
   inserting a member into said concave portion, and
   heating said pipe and member together to melt said solder so that it filtrates into the clearance between the inner surface of said concave portion and outer surface of said member.

3. A method for soldering a pipe to a member according to claim 2, wherein said member is made of aluminum sheet with solder coated thereon uniformly over an outer surface thereof.

4. The method of claim 2, wherein:
   in the forming step, the concave portion is made so that it is elongated axially of the pipe that is made in the pipe-making step;
   in the aperture-opening step, the aperture that is made is narrower than the bottom of the concave portion; and
   in the member-inserting step, an end of the member is caused to lie next to the bottom of the concave portion, at both flanks of the aperture.

5. The method of claim 4, wherein:
   in the member-inserting step, the inserted member is an end of a flat tube which is inserted until said end lies astride and circumscribes the aperture, so that upon completion of the heating step, the end of the flat tube is in sealed communication with the pipe through said aperture.

* * * * *